(12) United States Patent
Miller et al.

(10) Patent No.: US 11,911,932 B2
(45) Date of Patent: Feb. 27, 2024

(54) SYSTEM FOR MAKING A RIGID FOAM SUBSTITUTE

(71) Applicant: Thermopod, LLC, Mobile, AL (US)

(72) Inventors: Drayton Miller, Dauphin Island, AL (US); Paul Muncrief, Sacramento, NM (US)

(73) Assignee: ThermoPod, Inc, Mobile, AL (US)

( * ) Notice: Subject to any disclaimer, the term of this patent is extended or adjusted under 35 U.S.C. 154(b) by 137 days.

(21) Appl. No.: 16/942,697

(22) Filed: Jul. 29, 2020

(65) Prior Publication Data

US 2021/0031413 A1 Feb. 4, 2021

Related U.S. Application Data

(60) Provisional application No. 62/879,590, filed on Jul. 29, 2019.

(51) Int. Cl.
| | |
|---|---|
| *B29C 39/00* | (2006.01) |
| *D01G 7/00* | (2006.01) |
| *D01G 5/00* | (2006.01) |
| *B29B 7/90* | (2006.01) |
| *B07B 13/00* | (2006.01) |
| *B29C 39/02* | (2006.01) |
| *B29C 39/38* | (2006.01) |

(Continued)

(52) U.S. Cl.
CPC ............ *B29C 39/003* (2013.01); *B29B 7/242* (2013.01); *B29C 39/02* (2013.01); *B29C 39/24* (2013.01); *B29C 39/38* (2013.01); *D01G 5/00* (2013.01); *D01G 7/00* (2013.01); *B07B 13/00* (2013.01); *B29B 7/82* (2013.01); *B29B 7/90* (2013.01); *B29B 7/905* (2013.01); *B29C 2793/009* (2013.01); *B29K 2001/00* (2013.01); *B29K 2003/00* (2013.01); *B29K 2031/04* (2013.01); *B29K 2105/12* (2013.01); *B29K 2311/10* (2013.01); *D01B 1/14* (2013.01); *D01B 9/00* (2013.01)

(58) Field of Classification Search
None
See application file for complete search history.

(56) References Cited

U.S. PATENT DOCUMENTS

| | | | | |
|---|---|---|---|---|
| 2,483,406 A | * | 10/1949 | Francis, Jr. .............. | D04H 1/56 264/122 |
| 4,832,852 A | * | 5/1989 | Wells ..................... | D04H 1/498 210/671 |

(Continued)

*Primary Examiner* — Benjamin A Schiffman
(74) *Attorney, Agent, or Firm* — AdamsIP, LLC; Edward Brinkley Garner, III; James Hunter Adams

(57) ABSTRACT

A system and method for creating a rigid foam substitute is provided. By using natural binding materials and natural fiber materials, the system and method may be used to create environmentally friendly substitutes for expanded polystyrene. The system generally comprises a processing room and molding facility. The processing room may comprise an opener, cleaner, and blower, which may be used to break up and clean the natural fiber material. The molding facility may comprise a mixer, molder, and kiln, which may be used to create casts. The method generally entails processing a natural fiber material before mixing it with a natural binding material and fluid to create a fluidic mixture, wherein said fluidic mixture is subsequently molded and cured to create a finished product.

13 Claims, 4 Drawing Sheets

(51) Int. Cl.
  *B29C 39/24* (2006.01)
  *B29B 7/24* (2006.01)
  *B29K 105/12* (2006.01)
  *B29K 311/10* (2006.01)
  *B29B 7/82* (2006.01)
  *D01B 1/14* (2006.01)
  *D01B 9/00* (2006.01)
  *B29K 1/00* (2006.01)
  *B29K 31/00* (2006.01)

(56) References Cited

U.S. PATENT DOCUMENTS

| | | | | |
|---|---|---|---|---|
| 4,919,753 A * | 4/1990 | Johnson | ............... | C12P 19/04 |
| | | | | 162/146 |
| 5,057,168 A * | 10/1991 | Muncrief | ............... | D04H 1/74 |
| | | | | 442/411 |
| 5,156,743 A * | 10/1992 | Muncrief | ............... | E02B 15/101 |
| | | | | 210/671 |
| 5,642,601 A * | 7/1997 | Thompson, Jr. | ......... | D04H 1/54 |
| | | | | 428/921 |
| 5,665,439 A * | 9/1997 | Andersen | ............... | B32B 37/00 |
| | | | | 428/312.4 |
| 9,126,352 B2 * | 9/2015 | O'Callaghan | ......... | B01F 35/145 |
| 10,816,128 B2 * | 10/2020 | McGoff | ............... | B65D 90/046 |
| 2006/0029786 A1 * | 2/2006 | Wang | ............... | D04H 1/4218 |
| | | | | 428/292.1 |
| 2014/0272163 A1 * | 9/2014 | Tilton | ............... | D21J 1/08 |
| | | | | 427/427.4 |
| 2017/0043937 A1 * | 2/2017 | Lantz | ............... | B65D 81/09 |
| 2017/0217654 A1 * | 8/2017 | Harmon | ............... | B65D 1/34 |
| 2018/0229917 A1 * | 8/2018 | Jobe | ............... | B32B 3/04 |
| 2018/0237184 A1 * | 8/2018 | Jobe | ............... | B65D 81/261 |
| 2020/0102139 A1 * | 4/2020 | Jobe | ............... | B65D 65/466 |
| 2020/0122909 A1 * | 4/2020 | Jobe | ............... | B65D 65/466 |

* cited by examiner

SYSTEM FOR MAKING A RIGID FOAM SUBSTITUTE

CROSS REFERENCES

This application claims the benefit of U.S. Provisional Application No. 62/879,590, filed on Jul. 29, 2019, which application is incorporated herein by reference.

FIELD OF THE DISCLOSURE

The subject matter of the present disclosure refers generally to a process for creating a green rigid foam substitute.

BACKGROUND

Expanded polystyrene (EPS), is used in everything from construction insulation to packaging material, but few realize the environmental and health hazards that EPS pose. For one, EPS is resistant to photolysis and takes more than a million years to decompose. Though EPS can be recycled, the recycling market place is miniscule, meaning that many people could not recycle it even if they wanted to. Also, the main component of EPS, styrene, has been identified as a possible carcinogen by the International Agency for Research on Cancer. The health of people exposed to manufacturing processes involving styrene derived products could suffer as a result. Further, people who use products made of styrene could be exposed to styrene that leaches from said products. These people could also be exposed to benzene and dioxins as well, considering both chemicals are used in EPS production. All of this combined, accounts for a hidden cost of using EPS that has not necessarily been considered by much of the population. Additionally, because EPS is petroleum based, it is virtually impossible to forecast long-term cost because of the volatility of the petroleum marketplace. This is not the case, with renewable resource natural fibers that enjoy a virtually inexhaustible supply, from both original and recyclable sources.

Furthermore, many of the current substitutes for EPS are not necessarily cost effective and/or biodegradable. For instance, some EPS substitutes marketed as biodegradable use binders that are in fact not biodegradable. However, chemicals can be added during the manufacturing process that breaks down the non-biodegradable binders over time, thus allowing these EPS substitutes to be marketed as biodegradable. Without the addition of these chemicals, the EPS substitute is not realistically biodegradable, but the addition of the chemicals adds to the cost of production of these EPS substitutes, which makes these EPS substitutes economically uncompetitive to EPS. Further, many EPS substitutes are not necessarily better for the environment than EPS even if they are fully biodegradable due to energy and waste created during their manufacture when compared to the manufacture of EPS. For instance, many of the EPS substitutes are paper based substitutes that arguably produce more waste overall due to the water and air pollution created during the paper making process when compared to the production of EPS.

Additionally, a substantial amount of biomass is left behind during the clearcutting process (slash) when harvesting timber. This is not only wasteful but can create an environmental hazard since various types of pests may be attracted to the leftover biomass. Pine plantations in the south eastern United States must be particularly careful since slash can attract pine borers and other such pests that can devastate a pine timber crop in a very short time. Currently, slash resulting from a pine timber clear cutting harvest is often managed via chipping or burning. However, chipping the slash can decrease the amount of profit a timber harvest yields due to the added costs, and burning the slash can greatly reduce the biodiversity of the soil in which the timber was harvested, resulting in unfertile land over time. Using the slash in a way that could result in a profit would be optimal, but there currently are few ways in which the slash can be used to turn a profit.

Accordingly, there is a need in the art for a process that creates a cost-effective, green rigid foam substitute, that can replace current non-biodegradable foams, increase profits of renewable resource harvests, and minimize the health risks for consumers and the people involved in the manufacture of EPS.

DESCRIPTION

A process for creating a green rigid foam substitute is provided. In one aspect, the process creates a rigid biodegradable foam substitute out of biodegradable materials that can be molded into different shapes depending on the application. In another aspect, the process creates a rigid biodegradable foam substitute out of renewable materials that can be molded into different shapes depending on the application. Generally, the process of the present disclosure is designed to create an environmentally friendly substitute for expanded polystyrene (EPS).

The processing room is the start of the process, wherein the fiber bales are opened, cleaned, mixed, and blended. In a preferred embodiment, the processing room comprises an opener, beater, and blower. The various machines of the processing room break up and clean the natural fiber material so that it can be more readily used in a manner that creates a more consistent final product. Non-useable material and dust that are removed from the natural fiber material during processing is either suctioned away from the natural fiber material or separated from the natural fiber material through special filters or centrifugal force as it is processed. The natural fiber material, on the other hand, is decompressed and broken into pieces of a desired length before being blended with natural fiber material from various sources to create a more consistent final product. It is then transferred to a hopper of a mixer, where it is weighed prior to being mixed with a previously weighed amount of natural binding material and liquid. Because the amount of liquid in the natural fiber material and/or natural binding material may be different depending on the natural fiber material and/or natural binding material selected, the amount of liquid to be added to create the fluidic mixture with a weight percentage of at least fifteen percent may vary. For instance, cotton has a natural liquid pick-up weight of about seven percent. Therefore, the liquid content of the natural fiber material and natural binding material will determine the final, desired amount of liquid added to the mixer to create a fluidic mixture having the desired properties.

Opening is the first step within the processing room, and the goal is to gently break up compacted natural fiber material with as little loss as possible. Once the natural fiber material has been opened, it must be cleaned due to the fact that natural fiber materials often have non-useable material that must be removed before the natural fiber material can be effectively used to create a product. For instance, a natural fiber such as cotton may contain up to eighteen percent trash that must be removed before it can be used to make a product. Unfortunately, cleaning the natural fiber material entails losing some of the natural fiber material as waste along with the trash. Therefore, optimizing the cleaning efficiency to minimize the impact on fiber quality/loss resulting from trash removal is preferred over maximum trash removal. The most common method used to remove contaminants from the natural fiber material, including, but not limited to, leaf, stone, iron particles, jute, polypropylene, colored fibers, feather, or any combination thereof, is beating. In some embodiments, dust resulting from the opening and cleaning of the natural fiber material may also be removed. In some preferred embodiments, the natural fiber material may be mixed and/or blended to create a finished natural fiber material, which may be an essential step in creating a more consistent green rigid foam substitute since blending/mixing create a more consistent, processed natural fiber material.

Once the cotton, or other natural fiber, has been cleaned, it is transported to the mixer. In a preferred embodiment, transportation of the natural fiber material from the cleaner to the mixer is preferably done via a blower, but other methods of transportation may be used to transport the clusters of cotton, including, but not limited to, conveyor, suction, and by hand. Once the natural fiber material has been processed, the production of a green rigid foam substitute consists of four basic processes: mixing, molding, curing, and cubing. Mixing involves measuring the appropriate amount of natural binding material and natural fiber material before addition to a temperature-controlled vat. The natural fiber material and natural binding material are transferred to a weigh batcher of the mixer, which measures the proper amounts of each material. The amount of material used to create the fluidic mixture is about sixty percent to eighty-five percent natural fiber material to forty percent to fifteen percent natural binding material. Once the natural fiber material and natural binding material have been weighed, they are transferred into a mixer where they are blended together. In a preferred embodiment, the natural fiber material and natural binding material are transferred to the mixer via gravity. The temperature of the fluidic mixture is kept within a certain temperature range during the mixing phase, depending on the natural binding material and the natural fiber material chosen.

Once the fluidic mixture has been thoroughly mixed, it is transported to the molder. The fluidic mixture is transferred to a hopper of the molder, wherein the hopper injects the molder with the fluidic mixture at a controlled rate. In the molder, the fluidic mixture is forced downward into molds to create casts, wherein said molds consist of an outer mold box containing several mold liners. In some preferred embodiments, when the molds are full, the fluidic mixture is compacted by the weight of the top of the molds and into the mold cavities. The casts in the molds are pushed down and out of the molds onto a flat pallet, and the pallet and casts are then pushed out of the machine and onto a conveyor. The pallets of casts are conveyed to an automated stacker, which places them in a curing rack. Each rack may hold multiple casts. When a rack is full, it is rolled onto a set of rails and moved into a curing kiln where the casts are dried. Once the casts are dried, they are removed from the kiln and processed for shipping.

The preferred method steps that may be used to carry out the process of creating a green rigid foam substitute, using natural fibers and natural binder, are as follows: A user may obtain a bale of natural fiber material that may be used to create a green rigid foam substitute. The bales of natural fiber may then be broken up via the opener, and the clusters of natural fiber material may be processed into fibers of a particular size. After the natural fiber material has been processed, the natural fiber may be transferred to a weighing hopper of the mixer, where the natural fiber material is weighed before being added to a vat of the mixer along with a pre-weighed amount of natural binding material and liquid. Once the natural fiber material and natural binding material have been weighed and added to the vat, the mixer may mix the natural fiber material and natural binding material with liquid until a fluidic mixture is created having the desired consistency. The fluidic mixture may then be transported to the molder, wherein the molder may press the fluidic mixture into casts. The casts may then be transported to a curing station and allowed to cure before finally being removed and processed.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other methods for carrying out the same purpose of the methods disclosed herein. Those skilled in the pertinent art should also realize that such equivalent modifications do not depart from the scope of the methods of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including process steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a process comprising two or more defined steps, the defined steps can be carried out in any order or simultaneously (except where the context excludes that possibility), and the process can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. The term "green" and grammatical equivalents thereof are used herein to mean biodegradable, recyclable, compostable, and/or re-useable. For example, a foam substitute that is green may be both biodegradable and recyclable. The term "liquid" and grammatical equivalents thereof are used herein to mean any liquid that may be used to create a fluidic mixture that is "green." For example, a mixture of water and ethanol may be mixed with a natural fiber material 102 and natural binding material to create a fluidic mixture that is biodegradable, recyclable, compostable, and reusable.

Figure 1:
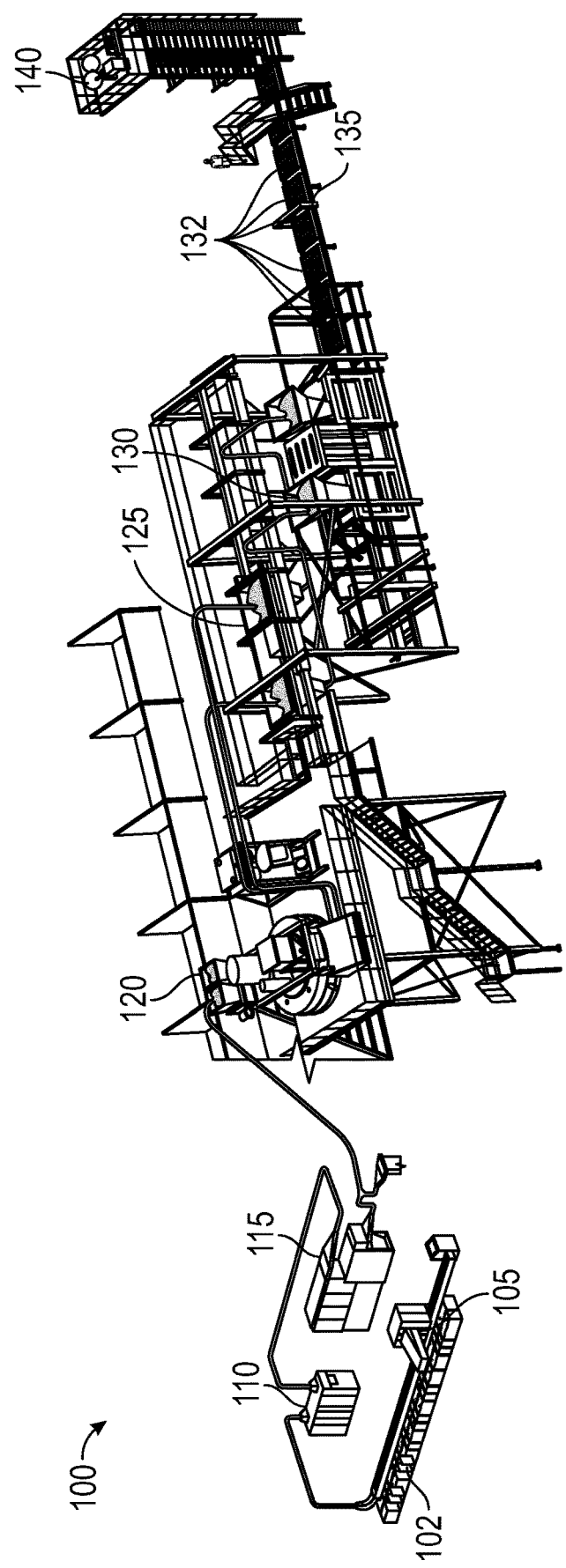
FIG. 1 is a schematic of a plant that may produce a green rigid foam substitute.
Figure 2:
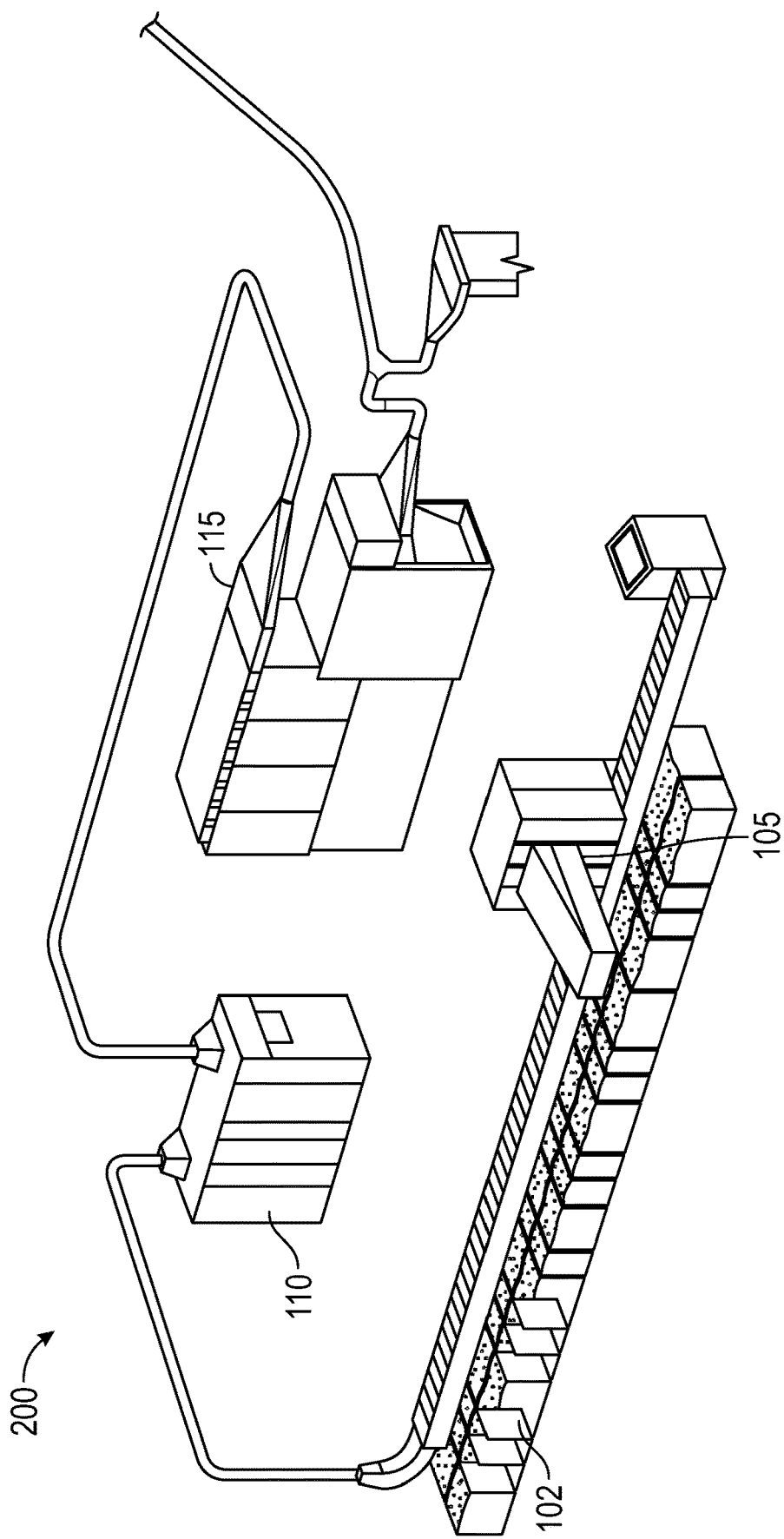
FIG. 2 is a schematic of a plant that may produce a green rigid foam substitute.
Figure 3:
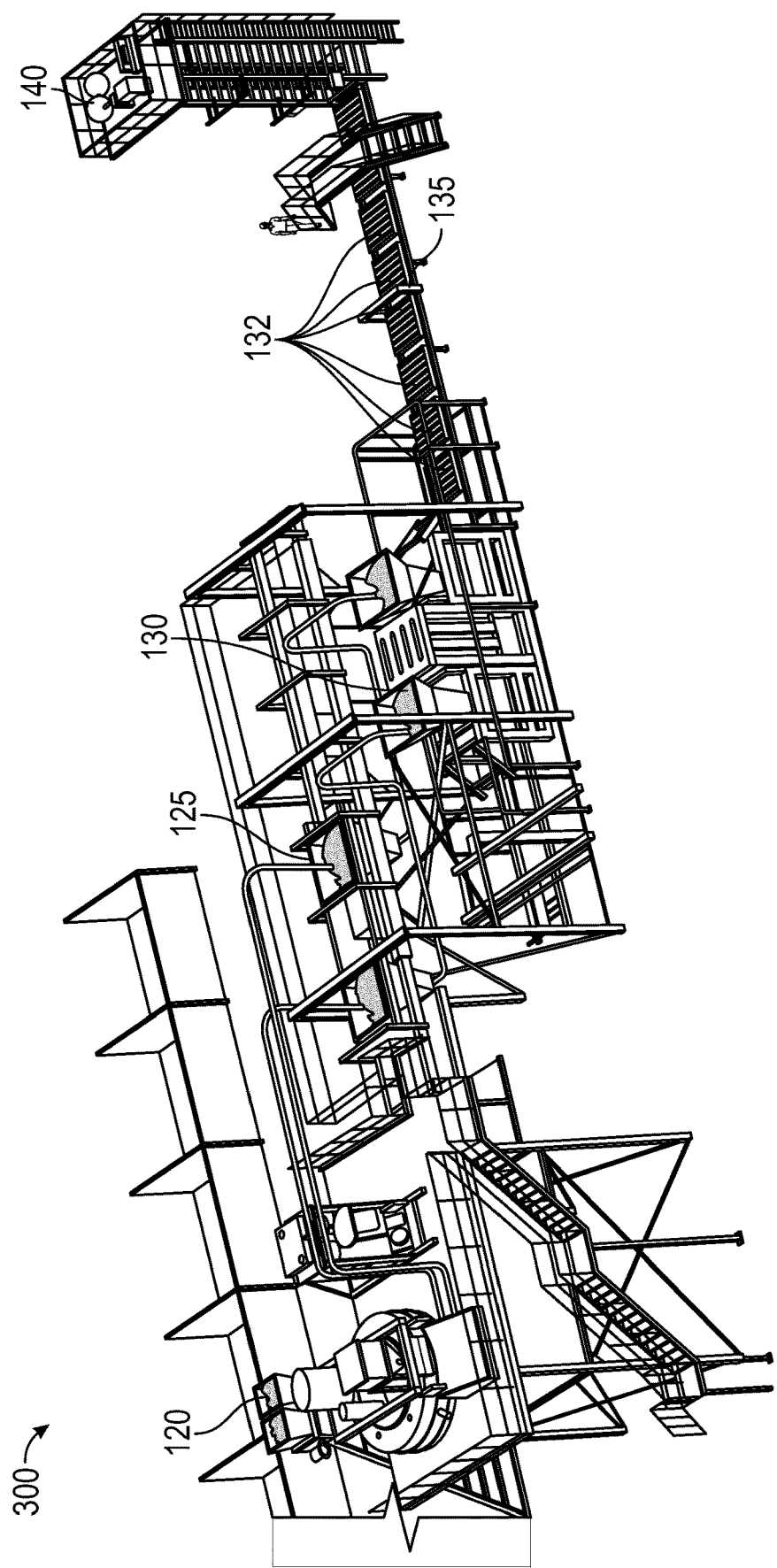
FIG. 3 is a schematic of a plant that may produce a green rigid foam substitute.
Figure 4:
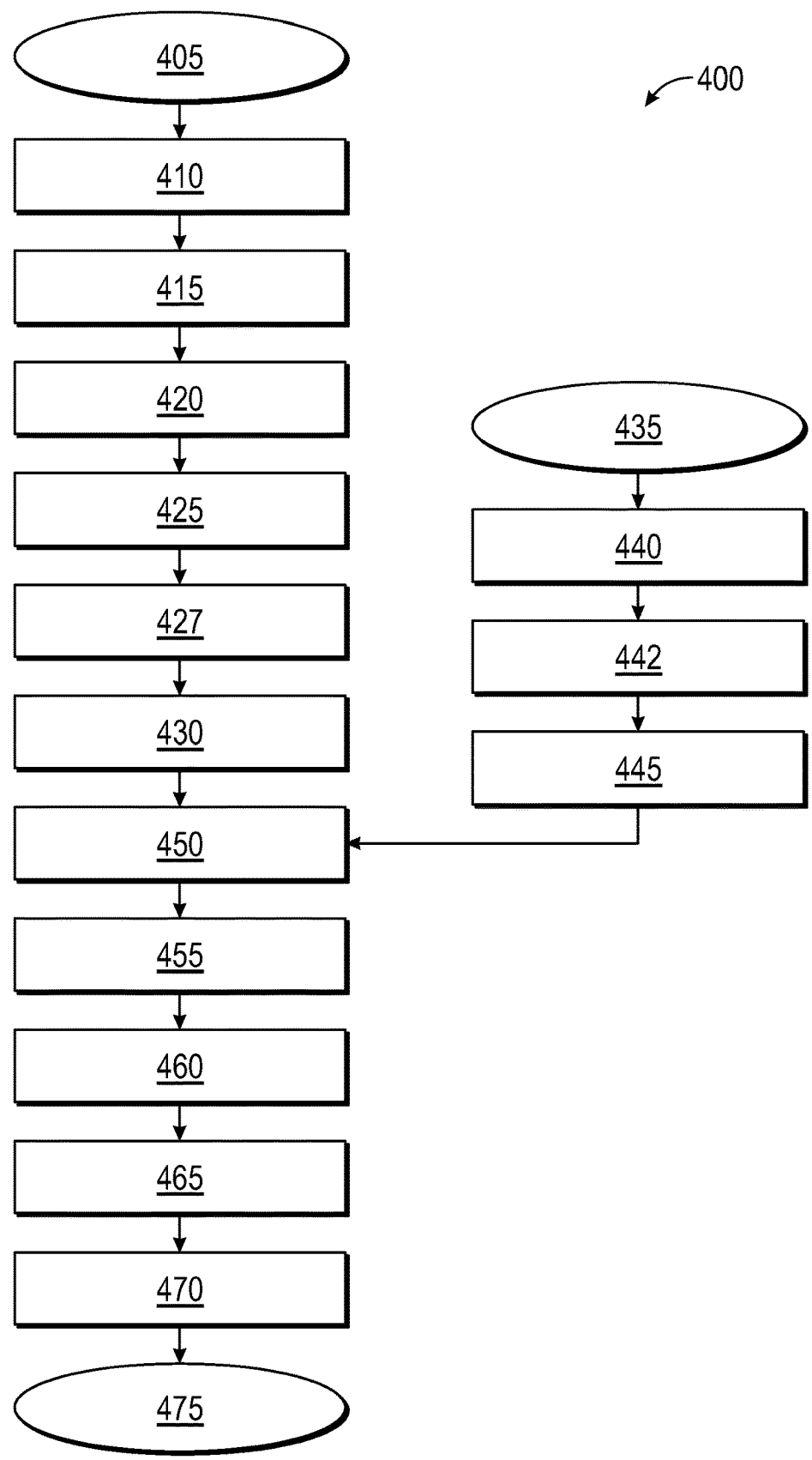
FIG. 4 is a flow chart illustrating certain method steps of a method embodying features consistent with the principles of the present disclosure.

FIGS. 1-4 illustrate embodiments of a facility that may be used to produce a green rigid foam substitute as well as a method for creating said green rigid foam substitute. In a preferred embodiment, the natural fiber material 102 and natural binding material used to make the green rigid foam substitute are cotton and cornstarch, respectively. As illustrated in FIGS. 1-3, the process begins by processing the natural fiber material 102 before mixing it with the natural binding material to create a fluidic mixture, which is subsequently molded and cured before being distributed. It is understood that the various method steps associated with the method of the present disclosure may be carried out by a user using the systems 100, 200, 300 shown in FIGS. 1-3. FIG. 1 is an exemplary diagram of a facility that may be used to produce a green rigid foam substitute from a natural fiber material 102 and natural binding material. FIG. 2 is an exemplary diagram of the natural fiber material 102 processing section of a facility that may be used to produce a green rigid foam substitute from said natural fiber material 102 and said natural binding material. FIG. 3 is an exemplary diagram of a mixing and molding section of a facility that may be used to produce a green rigid foam substitute from a natural fiber material 102 and natural binding material. FIG. 4 illustrates various methods that may be carried out by a user using the facility of FIGS. 1-3 to produce a green rigid foam substitute from a natural fiber material 102 and natural binding material.

The processing room, as illustrated in FIGS. 1 and 2, is the start of the green rigid foam substitute process, wherein the natural fiber material 102 is opened, cleaned, mixed, and blended. In a preferred embodiment, the processing room comprises an opener 102, cleaner 110, and blower 115. The various machines of the processing room break up and clean the natural fiber material 102 so that it can be more readily used in a manner that creates a more consistent final product. Non-useable material and dust that are removed from the natural fiber material 102 during processing are either suctioned away from the natural fiber material 102 or separated from the natural fiber material 102 using special filters. Once the natural fiber material 102 has been processed, it is transferred to a hopper of a mixer 120, where it is weighed prior to being mixed with a natural binding material and a desired/specific amount of water, to create the correct fluidic mixture.

Opening is the first step within the processing room. The objective of opening is to break up compacted natural fiber material 102 with as little loss as possible. Opening may be defined as the tearing apart of the compressed natural fiber material 102 via gentle manipulation until it is separated into small clusters. Natural fiber materials 102 that may be used to create a foam substitute include, but are not limited to, cotton, hemp, bamboo, wood, coconut coir, walnut shell, rice husks, pine fiber, wool, or any combination thereof. Compressed blocks of natural fiber material 102 are broken apart and then processed until the natural fiber material 102 is of a desired length. Generally, this requires transporting the natural fiber material 102 to a cleaner 110, such as a scutching machine or beater.

In a preferred embodiment, the compacted natural fiber is in the form of a cotton bale, and the opener 102 is a bale processor, as illustrated in FIGS. 1 and 2. The cotton bales are placed in a uniform layer, and the bale processor equally removes clusters of the cotton from each of the cotton bales. The bale processor may comprise two supporting rollers, a pressing roller, and two opening rollers. The supporting rollers contain spikes used for picking up the cotton bales, and the pressing roller evens out the cotton prior to cutting. The opening rollers cut the cotton into clusters, wherein those clusters are them transported to the cleaning phase of the processing room. The transport of the clusters of cotton fiber material from the opener 102 to the cleaner 110 is preferably done via a suction tube, but other methods of transportation may be used to transport the clusters of cotton, including, but not limited to, conveyor, blower 115, hand, or any combination thereof. In another preferred embodiment, cotton motes and linters may be added directly to the cleaning phase of the processing room. Because cotton linters and motes consist of shorter fibers of cotton, they are particularly useful for this particular process since shorter natural fibers are desirable. This is especially true considering the cost effectiveness of using cotton motes and linters, which is largely considered a waste byproduct of the cotton processing process.

In another preferred embodiment, the compacted natural fiber material 102 may be blocks of red cedar bark fiber. Red cedar bark is the lightest of commercial softwood trees; therefore, its fiber can be used to make a lightweight foam substitute. Also, its low shrinkage factor means that a fluidic mixture comprising red cedar bark fiber should not be prone to undergoing large volume changes while during the molding process. Additionally, red cedar bark is decay resistant, meaning that a foam substitute comprising red cedar bark fiber should last longer than foam substitutes comprising many other types of natural fibers. Further, because red cedar bark has superior thermal insulating properties due to the lower density of its fibers and excellent acoustical dampening properties due to the cellular structure that converts sound energy into heat via frictional and viscoelastic resistance, foam substitutes comprising red cedar bark fiber make excellent insulators.

Natural fiber materials 102 often have trash that must be removed before the natural fiber material 102 can be effectively used to create a green rigid foam substitute. For instance, cotton may contain up to eighteen percent trash that must be removed before it can be used to make a green rigid foam substitute. Cleaning the natural fiber material 102 entails losing some of the natural fiber material 102 as waste along with the trash. Depending on the application, it may not be necessary to remove one hundred percent of the trash. In such a case, it is best to remove as much trash as possible while limiting the waste of the natural fiber material 102 resulting from the removal of said trash. Therefore, it is often beneficial to measure the amount of trash removed and compare it to the amount of wasted natural fiber material 102. This will allow a user to determine the cleaning efficiency of the processing room. If the benefit of removing trash past a certain point is outweighed by the loss of natural fiber material 102, then a user can optimize the cleaning phase of the processing room to make it more cost effective. In other words, by optimizing the cleaning efficiency, one can minimize the impact on fiber quality/loss resulting from maximum trash removal, which ultimately produces a less expensive green rigid foam substitute.

Common contaminants of natural fiber material 102 include, but are not limited to, leaf, stone, iron particles, jute, polypropylene, colored fibers, feather, or any combination thereof. In one preferred embodiment, the natural fiber material 102 is cleaned via a scutching machine, which breaks the natural fiber material 102 into pieces using rollers and then removes waste using paddles and combs. In some embodiments, the rollers may comprise of spikes that further opens the natural fiber material 102. In another preferred embodiment, a beater is used to fine clean the natural fiber material 102 and reduce the fiber length to a specified size. Types of beaters that may be used to clean the natural fiber material 102 include, but are not limited to, porcupine beaters, two bladed beaters, and three bladed beaters. Grid bars allow natural fiber material 102 of a certain size to pass through to the next phase of the process. Types of grid bars that may be used in the system 100, include, but are not limited to, slotted sheet, perforated sheet, triangular section bars, angle, and blade.

In some embodiments, dust resulting from the opening and cleaning of the natural fiber material 102 may be removed. This may be necessary due to health reasons or to create a cleaner 110 natural fiber material 102. The most common form of dust removal is via suction, but filters may also be used to remove dust. Suction may occur between the machines via dust cages, dust extractors, etc. or within the machine by normal air separation. The efficiency depends not only on the devices but also on the size of the clusters. The smaller the clusters, the higher the efficiency of dust removal. Dust removal systems that use filters have the added benefit of capturing wasted natural fiber material 102, which may then be used to create a foam substitute. Air current manipulation may also be used to remove dust from the natural fiber material 102. This may be achieved via an imbalance of centrifugal and aerodynamic forces acting on the dust particles.

In one preferred embodiment, the natural fiber material 102 may be mixed and/or blended to create a finished natural fiber material 102. Mixing may be defined as the intermingling of different classes of fibers of the same grade whereas blending may be defined as the intermingling of different kinds of fibers or the intermingling of different grades of the same fibers. Blending/mixing of natural fiber material 102 may be an essential step in creating a more consistent green rigid foam substitute since blending/mixing create a more consistent processed natural fiber material 102. Natural fiber material 102 may be mixed/blended at various stages of the process. However, the opening process is one of the most important stages for blending since the components are still separate and can be mixed/blended without the reliance on random forces. For instance, a well-assembled cotton bale layout may result in an even extraction of fibers from all bales prior to cleaning and can, therefore, result in the blending/mixing of different sources of natural fiber material 102 without the need to depend on random effects. In some preferred embodiments, a blending/mixing machine may be used to combine different sources, types, and grades of natural fiber material 102. Objectives of mixing/blending include, but are not limited to, more consistent fiber quality, increased processing performance, more consistent functional properties, and uniform feeding to the next stage of the green rigid foam substitute process.

Once the natural fiber material 102 has been cleaned, it is transported to the mixer 120. In a preferred embodiment, transportation of the natural fiber material 102 from the cleaner 110 to the mixer 120 is done via a blower 115, but other methods of transportation may be used to transport the cleaned natural fiber material 102, including, but not limited to, conveyor, suction, and by hand. The blower 115 may transport the processed natural fiber material 102 using a constant air flow that keeps a constant pressure within a transport tube. Once the natural fiber material 102 has been processed and transported to the mixer 120, the production of a green rigid foam substitute consists of three processes: mixing, molding, and curing. A facility designed to create a green rigid foam substitute material may produce a variety of products. For instance, some facilities may produce only biodegradable packaging "peanuts," while others may produce a wide variety of green rigid foam substitute products, including, but not limited to peanuts, shredded, sheets, egg crate, and molded block configurations.

The mixing process involves measuring the appropriate amount of natural binding material, natural fiber material 102, and liquid before addition to a temperature-controlled vat. The natural fiber material 102 and natural binding material are stored in storage bins that are refilled as needed. As a production run starts, the required amounts of natural fiber material 102, natural binding material, and liquid are transferred to a weigh hopper of the mixer 120, which measures the proper amounts of each material. The amount of material used to create the fluidic mixture is about sixty weight percent to eighty-five weight percent natural fiber material 102 to about forty weight percent to fifteen weight percent natural binding material and liquid. In another preferred embodiment, the fluidic mixture requires at least fifteen weight percentage liquid. In yet another preferred embodiment, eighty-five weight percent cotton is used for every fifteen weight percent natural binding material and liquid. Alternatively, red cedar bark fiber and/or pine fiber may be used in place of cotton fiber to create the fluidic mixture.

Some preferred embodiments of a fluidic mixture may comprise a plurality of fibers having different lengths. For instance, one preferred embodiment of a fluidic mixture may comprise fifty weight percent cotton linters (short linen fibers), thirty-five weight percent cotton fibers having a length of ⅓ inches to ½ inches in length (longer linen fibers), and fifteen weight percent natural binding material and liquid. Other preferred embodiments of a fluidic mixture may comprise a plurality of different natural fiber materials 102 so that the fluidic mixture may be made from multiple fiber sources. For instance, one preferred embodiment of a fluidic mixture may comprise twenty-five weight percent cotton linters (short linen fibers), thirty weight percentage of pine fibers having a length of approximately 3 millimeters, thirty weight percentage of hemp fibers having a length between approximately ⅓ inches to ½ inches, and fifteen weight percent natural binding material and liquid. This will allow a user of the system 100 to make the rigid foam substitute from multiple natural fiber materials 102, depending on the cost and availability of the natural fiber materials 102 as well as the desired properties of the final product.

Liquids that may be used to make the fluidic mixture include, but are not limited to, water, ethanol, methanol, propanol, butanol, ethyl acetate, propyl acetate, acetone, or any combination thereof. Because the amount of liquid in the natural fiber material 102 and/or natural binding material may be different depending on the natural fiber material 102 and/or natural binding material being used, the amount of liquid to be added to create the fluidic mixture having a weight percentage of fifteen percent or greater of natural binding material and liquid may vary. For instance, cotton has a natural liquid pick-up weight of about seven percent, so the weight percentage of liquid within the cotton must be accounted for. Therefore, the liquid content of the natural fiber material 102 and natural binding material will determine the final, desired amount of liquid added to the mixer 120 to create the fluidic mixture.

Once the natural fiber material 102, natural binding material, and liquid have been weighed, they are transferred into the mixer 120 where they are blended together. In a preferred embodiment, the natural fiber material 102 and natural binding material are transferred to the mixer 120 via gravity. The system 100 described in FIGS. 1 and 3 depict the mixer 120 as a stationary mixer 120 such as a pan mixer 120 or a horizontal drum mixer 120. The temperature of the fluidic mixture is preferably kept within a certain temperature range during the mixing phase, depending on the natural binding material and the natural fiber material 102 chosen. For instance, a fluidic mixture comprising cotton and corn starch is preferably kept within a temperature range of one-hundred-and-forty and one-hundred-and-sixty Fahrenheit during the mixing phase. For instance, a fluidic mixture comprising cotton and polyvinyl acetates is preferably kept within a temperature range between eighty and ninety Fahrenheit during the mixing phase. The fluidic mixture is preferably mixed for at least one minute.

Once the fluidic mixture has been thoroughly mixed, it is transported to the molder 130. In one preferred embodiment, the fluidic mixture is transported from the mixer 120 to the molder 130 via a conveyor belt. In another preferred embodiment, the fluidic mixture is transported from the mixer 120 to the molder 130 via an inclined trough. In yet another preferred embodiment, the fluidic mixture is transported from the mixer 120 to the molder 130 via an inclined bucket conveyor 125, as depicted in FIGS. 1 and 3. The fluidic mixture is transferred to a hopper of the molder 130 where the fluidic mixture is then fed into the molds at a controlled rate to create casts 132. The molds consist of an outer mold box containing several mold liners, which may be changed depending on the desired shape. In some preferred embodiments, when the molds are full, a top of the molds is closed, which compacts the fluidic mixture into the mold cavities. This compaction may be supplemented by air or hydraulic pressure cylinders acting on the top. In another preferred embodiment, mechanical vibration may also be used to aid compaction. The casts 132 may then be pushed down and out of the molds onto a flat steel pallet. The pallet and casts 132 are pushed out of the machine and onto an apron 135. In some preferred embodiments, the casts 132 may pass under a rotating brush, which may remove loose material from the top of the casts 132.

The pallets of casts 132 are conveyed to an automated stacker, which places them in a curing rack. Each rack may hold multiple casts 132. When a rack is full, it is rolled onto a set of rails and moved into a curing kiln 140. A kiln 140 may be defined as a thermally insulated chamber that produces temperatures sufficient to complete the drying process for the casts 132. The kiln 140 is an enclosed room with the capacity to hold several racks of casts 132 at a time. Types of kilns 140 that may be used to cure the casts 132 include, but are not limited to, electric, gas, wood, or any combination thereof. In a preferred embodiment, an electric kiln 140 is used. Once the casts 132 have been cured in the kiln 140, they may be removed and sold as a green rigid foam substitute. Other preferred embodiments of the system 100 may further comprise a fogger, wherein said fogger coats the casts 132 with a starch to help hold the natural fiber material 102 of the casts 132 in place. The fogger may be used after casting and/or after curing of the casts 132. The coating of starch may prevent moisture from being absorbed back into the natural binding material after undergoing curing in the kiln 140.

FIG. 4 provides a flow chart 400 illustrating certain, preferred method steps that may be used to carry out the process of creating a green rigid foam substitute using a natural fiber material 102 and natural binding material, as illustrated in FIGS. 1-3. Step 405 indicates the beginning of the method. During step 410, a user may obtain a block of natural fiber material 102 that may be used to create a green rigid foam substitute. In a preferred embodiment, the natural fiber material 102 is cotton and the blocks of natural fiber material 102 are cotton bales. In another preferred embodiment, the natural fiber material 102 is red cedar bark and the blocks of natural fiber material 102 are compressed red cedar blocks. The blocks of natural fiber material 102 may then be broken up via the opener 102 during step 415, and the opened blocks of natural fiber may subsequently be cleaned during step 420. In a preferred embodiment, the natural fibers are broken into lengths between 0.5-0.75 inches during the cleaning process. After the natural fiber has been cleaned, the natural fiber may be blown by the blower 115 during step 425 to fluff the natural fiber and further clean it. The blower 115 may then transport the natural fiber material 102 to a weighing hopper of a mixer 120 during step 427, wherein the natural fiber material 102 is weighed before being added to the vat of the mixer 120 during step 430. During step 440, a user may obtain a natural binding material that may be used to create a green rigid foam substitute. Natural binding materials that may be used to create the fluidic mixture include, but are not limited to, starch, polyvinyl acetates (Elmer's glue), lignins, tannins, sugar, cellulose, hemicellulose, dextrin, or any combination thereof. In a preferred embodiment, the natural binding material is corn starch. A hopper may then transport the natural binding material to a weighing hopper of the mixer 120 during step 442, wherein the natural binding material is weighed before being added to the vat of the mixer 120 during step 445.

Once the natural fiber material 102 and natural binding material have been weighed and added to the vat, the mixer 120 may mix the natural fiber material 102 and natural binding material with a liquid until a fluidic mixture is created having the desired consistency during step 450. The fluidic mixture may then be transported to the molder 130 during step 455. In a preferred embodiment, an apron 135 is used to transport the fluidic mixture to the molder 130. Once the molder 130 has been injected with the fluidic mixture, the molder 130 may press the fluidic mixture into casts 132 during step 460. The casts 132 may then be transported to a curing station during step 465. In a preferred embodiment, the method used to transport the casts 132 from the molder 130 to the curing station is via an apron 135. The casts 132 are allowed to cure in the molding station during step 470. After the casts 132 have been cured, the method may proceed to the terminate method step 475.

In an alternative embodiment, the system 100 may further comprise the step of shredding the cured casts 132 to create a shredded green insulation substitute. This shredded green insulation substitute may then be collected and used in construction projects to insulate completed walls, attics, and other areas that might benefit from a blown-in insulation. In a preferred embodiment, the shredded green insulation substitute may be blown into hollow spaces to increase R-value and promote noise reduction. Because the shredded green insulation substitute may be blown into hollow spaces without having to remove large sections of wall, floor, ceiling, etc., it may be used to increase R-value and reduce noise transmission of walls, floors, ceilings, etc. after construction has completed. In yet another preferred embodiment, once the natural fiber material, natural binding material, and liquid have been mixed together to create a fluidic mixture, the fluidic mixture may be transferred to containers in a way such that the fluidic mixture may be used as a green spray-foam insulation substitute. Because red cedar bark has excellent thermal, acoustical, and degradation properties compared to other natural fiber materials, a shredded green insulation substitute or a green spray-foam substitute comprising red cedar bark is a viable greener alternative to many of the blown-in insulations currently on the market today. For instance, cellulose insulation is often treated with borax to ward off insects, but red cedar bark has natural oils that may ward off insects without the need of treatment with chemicals such as borax.

Although the systems and processes of the present disclosure have been discussed for use within the wastewater treatment field, one of skill in the art will appreciate that the inventive subject matter disclosed herein may be utilized in other fields or for other applications in which wastewater treatment is needed. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and process stages which have been described and illustrated in order to explain the nature of this inventive subject matter can be made without departing from the principles and scope of the inventive subject matter.

What is claimed is:

1. A system for making a rigid foam substitute comprising:
   an opener configured to decompress compressed natural fiber material via gentle manipulation of said compressed natural fiber material using rollers of said opener,
      wherein decompression of said compressed natural fiber material results in a natural fiber material,
   a cleaner configured to break said natural fiber material into pieces of natural fiber material having a specific length,
      wherein said rollers of said cleaner breaks said natural fiber material into said pieces of natural fiber material,
      wherein trash of said natural fiber material is removed from said natural fiber material while said natural fiber material is broken into said pieces of natural fiber material,
      wherein said trash of said natural fiber material comprises at least one of leaf, stone, iron particles, jute, polypropylene, colored fibers, and feather,
      wherein said trash of said natural fiber material is removed by at least one of a comb and paddle of said cleaner,
   a mixer configured to create a fluidic mixture from said pieces of natural fiber material, a liquid, and a natural binding material,
      wherein said pieces of natural fiber material received from said cleaner and used to create said fluidic mixture differ in at least one of size, grade, source, or type,
      wherein said mixer receives said pieces of natural fiber material from said cleaner, liquid, and natural binding material within at least one hopper of said mixer,
      wherein said at least one hopper weighs at least one of said pieces of natural fiber material liquid, and natural binding material to a desired amount,
      wherein said at least one hopper transfers said pieces of natural fiber material liquid, and natural binding material to a vat of said mixer,
      wherein said mixer maintains a desired temperature range while said pieces of natural fiber material liquid, and natural binding material are mixed within said vat,
   a molder configured to shape said fluidic mixture into a cast having a desired shape,
      wherein said molder receives said fluidic mixture from said vat and compacts said fluidic mixture into at least one mold to create a cast,
      wherein said desired shape of said cast is based on said at least one mold within said molder,
      wherein said cast is pushed out of said at least one mold,
   a kiln configured to cure said cast.

2. The system of claim 1, further comprising a stacker, wherein said stacker arranges a plurality of casts created by said molder in a curing rack, wherein said stacker transports said curing rack to said kiln when said curing rack is filled with said plurality of casts.

3. The system of claim 1, wherein said source of said compressed natural fiber material comprises at least one of cotton, hemp, bamboo, wood, coconut coir, walnut shell, rice husks, pine fiber, and wool.

4. The system of claim 3, wherein said natural binding material comprises at least one of polyvinyl acetate, lignin, tannin, glucose, cellulose, hemicellulose, and dextrin.

5. The system of claim 4, wherein said liquid comprises water and at least one of ethanol, methanol, propanol, butanol, ethyl acetate, propyl acetate, and acetone.

6. The system of claim 4, wherein said natural fiber material comprises cotton and said natural binding material comprises corn starch, wherein said desired temperature range is between 140 and 160 Fahrenheit.

7. The system of claim 4, wherein said natural fiber material comprises cotton and said natural binding material comprises polyvinyl acetate, wherein said desired temperature range is between 80 and 90 Fahrenheit.

8. A system for making a rigid foam substitute comprising:
   a cleaner configured to remove trash from at least two decompressed natural fiber materials that were mixed during an opening process,
      wherein said cleaner breaks said at least two decompressed natural fiber materials into pieces of natural fiber material via a plurality of rollers having a specific length, wherein trash of said at least two decompressed natural fiber materials is removed from said at least two decompressed natural fiber materials while said at least two decompressed natural fiber materials are broken into said pieces of natural fiber materials, wherein said trash of said at least two natural fiber materials comprises at least one of leaf, stone, iron particles, jute, polypropylene, colored fibers, and feather, wherein said trash of said at least two decompressed natural fiber materials is removed by at least one of a comb and paddle of said cleaner, a mixer operably connected to said cleaner and configured to create a fluidic mixture within a vat using said pieces of natural fiber material, a liquid, and a natural binding material, wherein said pieces of natural fiber material are received in a first hopper of said mixer, wherein said natural binding material is received in a second hopper of said mixer, wherein said pieces of natural fiber material of said first hopper and said natural binding material of said second hopper are transferred to said vat of said mixer, wherein said pieces of natural fiber material received from first hopper and said second hopper differ in at least one of size, grade, source, or type, wherein a specified amount of a liquid is transferred to said vat, wherein said mixer maintains a desired temperature range while said pieces of natural fiber material, liquid, and natural binding material are mixed within said vat, a molder operably connected to said mixer and configured to shape said fluidic mixture into a cast having a desired shape, wherein said molder automatically receives said fluidic mixture from said mixer and compacts said fluidic mixture into at least one mold to create a cast, wherein said desired shape of said cast is based on said at least one mold within said molder, wherein said cast is pushed out of said at least one mold, and a kiln operably connected to said molder and configured to cure said casts.

9. The system of claim 8, wherein said cleaner is operably connected to said mixer via at least one of a blower, conveyor, and suction device.

10. The system of claim 8, wherein said mixer is operably connected to said molder via at least one of an inclined trough and inclined bucket conveyor.

11. The system of claim 8, wherein said molder is operably connected to said kiln via at least one of an apron and a stacker.

12. The system of claim 8, wherein said fluidic mixture comprises approximately sixty weight percent to eighty-five weight percent of said pieces of natural fiber material and approximately forty combined weight percent to fifteen combined weight percent of said natural binding material and said liquid.

13. The system of claim 12, wherein said fluidic mixture comprises at least fifteen weight percentage liquid, wherein at least a portion of said liquid is provided by said pieces of natural fiber material.

* * * * *